United States Patent [19]

Hsieh

[11] Patent Number: 5,790,971
[45] Date of Patent: Aug. 4, 1998

[54] FREQUENCY-LOCKED STEPPING POSITION CONTROL SYSTEM

[75] Inventor: Guan-Chyun Hsieh, Taipei Hsien, Taiwan

[73] Assignee: National Science Council, Taipei, Taiwan

[21] Appl. No.: 666,034

[22] Filed: Jun. 19, 1996

[51] Int. Cl.$^6$ .................................................. G05B 11/06
[52] U.S. Cl. ...................... 701/99; 701/102; 318/603; 318/608; 318/696; 388/805; 388/911; 388/912
[58] Field of Search ........................ 701/99, 102, 110, 701/70; 318/603, 606, 608, 696; 388/805, 912, 911

[56] References Cited

U.S. PATENT DOCUMENTS

| | | | |
|---|---|---|---|
| 4,644,749 | 2/1987 | Somes | 60/459 |
| 4,810,941 | 3/1989 | Ohishi et al. | 388/815 |
| 4,999,558 | 3/1991 | Onodera et al. | 318/685 |
| 5,548,455 | 8/1996 | Sato | 360/73.11 |

Primary Examiner—Tan Q. Nguyen
Attorney, Agent, or Firm—Townsend and Townsend and Crew LLP

[57] ABSTRACT

A frequency-locked stepping position control servo (FLSPS) system for driving a stepping motor. It essentially comprises a means for driving the stepping motor to move an object toward a target according to a driving signal, a means for detecting position of the object, a position-to-frequency converter to feedback the position information and a microprocessor-based slope-varied frequency-controlled oscillator (μP-SVFCO) to generate the driving frequency. The μP-SVFCO includes a microprocessor to ease the implementation of the control law and utilizes the slope-varied technique to adaptively pump the pulse train frequency of the driving signal. In addition, a one-bit clock is provided to dynamically maintain the position of the object when the target position is reached. The FLSPS system is capable of achieving similar system acquisition times for different target commands among a wide-range of positioning control commands.

10 Claims, 9 Drawing Sheets

FREQUENCY-LOCKED STEPPING POSITION CONTROL SYSTEM

BACKGROUND OF THE INVENTION

1. Field of the Invention

The present invention in general relates to a control servo system, more specifically, to a frequency-locked stepping position control system, which is capable of achieving similar system acquisition times for different position commands during wide-range positioning control. In addition, no motion profiles need to be pre-installed in this control system and more accurate position control can be achieved.

2. Description of Related Art

The control algorithm of an analog servomechanism is frequently executed by adjusting the key parameters of proportional, integral, and derivative constants. This kind of controller is usually named a PID controller. Practically, it is difficult to adaptively control the performance of the PID controller, even in the control a perfect integrator may be formed by operational amplifiers (OPamp). Furthermore, it may be cumbersome to realize the design of system control profiles, including acceleration, constant speed motion and deceleration, in the controller of a speed/position control system. In short, the speed/position controller using PID may not have a good control strategy for achieving nearly zero steady-state error, fast and stable response and lower overshoot.

In order to attain good performance and high accuracy in a servomechanism, a phase-lock technique has been utilized in servo speed control systems since the 1970s, as recited in "Phase-locked loops for motor-speed control," by Moore, A. W., in IEEE Spectrum, vol. 10, pp. 61–67 (1973). However, the PID control is still used in this kind of phase-locked servo system and thus, the performance of the phase-locked servo system has not been improved completely.

To improve the system performance of the phase-locked servo system, an adaptively digital-pump controller (ADPC) and a frequency-pumped controller (FPC) for speed and position control were then developed, as recited in "Adaptive digital pump controller (phase/voltage) controller," in Proc. Int. Conf. Power Conv. Ind. Contr., Singapore, pp. 1–5 (1986), and "An adaptive digital pump controller for phase-locked servo systems," in Proc. IEEE IECON'86, Milwaukee, pp. 389–394 (1986). However, control systems based on these controllers still suffer from a drawback. Much different settling times for variable servo commands are found. The phenomenon is primarily caused by the fact that the pump voltage for driving the stepping motor is still pumped at a constant rate. As a result, a larger speed or longer distance command will give rise to a longer acquisition time in the system. Further modifications to these control systems have been made by many researchers, however, other features, such as accuracy and acquisition time, are also reduced at the same time.

SUMMARY OF THE INVENTION

An object of the present invention is to provide a servo control system, which is capable of achieving similar system acquisition times for different position commands among a wide-range of positioning control commands.

Another object of the present invention is to provide a servo control system, which can adaptively pump the pulse train frequency for driving a stepping motor without pre-installed motion profiles.

Another object of the present invention is to provide a servo control system, which has faster and more precise positioning capability than the prior art, that is, less acquisition time, overshoot and the steady-state errors.

According to the above-mentioned objects, the present invention provides a frequency-locked stepping position control system for driving a stepping motor, comprising:

a means for driving the stepping motor by a driving signal with a first frequency, to move an object toward a target indicated by an external input command;

a means for detecting the position of the object to generate a position signal representing the position of the object;

a means for position-to-frequency converting the position signal into a feedback signal with a second frequency that corresponds to the position of the object;

a means for comparing the second frequency of the is feedback signal with a third frequency of an input signal to generate an error signal with a fourth frequency that is the same as the difference of the second frequency and the third frequency;

a microprocessor for generating the input signal corresponding to the external input command, generating a first time-base signal and a second time-base signal, and generating a control signal;

a means for tracking the control signal from the microprocessor to generate a pump slope constant;

a means for consecutively sampling the error signal by the first time-base signal and the second time-base signal, wherein the error signal sampled by the first time-base signal is applied to the microprocessor to generate the control signal;

a slope-varied converter for varying a pump voltage according to the sampled error signal from the sampling means and the pump slope constant; and a means for voltage-to-frequency converting the pump voltage into the driving signal, wherein the first frequency of the driving signal is proportional to the pump voltage.

The slope-varied converter comprises:

a counter for generating a speed-up signal and a speed-down signal, indicating whether the first frequency of the driving signal is increasing or decreasing, according the sampled error signal from the sampling means;

a means for providing a reference voltage of the pump voltage corresponding to the pump slope constant;

a first means for converting the speed-up signal into analog form to raise the reference voltage to the pump voltage; and a second means for converting the speed-down signal into analog form to reduce the reference voltage to the pump voltage.

BRIEF DESCRIPTION OF THE DRAWINGS

The detailed description of an embodiment of the present invention is made with reference to the accompanying drawings, wherein.

DETAILED DESCRIPTION OF THE PREFERRED EMBODIMENT

A new microprocessor-based slope-varied frequency-controlled oscillator (hereafter referred to as µP-SVFCO) is used to build a frequency-locked stepping position servo system (hereafter referred to as FLSPS) in this embodiment, such that the FLSPS is capable of achieving similar system acquisition times for different position commands among a wide-range of positioning control commands. The microprocessor of the µP-SVFCO is used as a digital controller because of the ease of implementation of the control law. In addition, all position commands in the FLSPS of the present invention are represented in terms of frequencies so that the frequency-locked technique can be applied. At the beginning, the FLSPS configuration of the present invention is described in detail, then a realization prototype of the µP-SVFCO is presented. Finally, comparisons of the experiment results from the µP-SVFCO prototype and simulation results by using MATLAB and SIMNON computer software programs are made.

Figure 1:
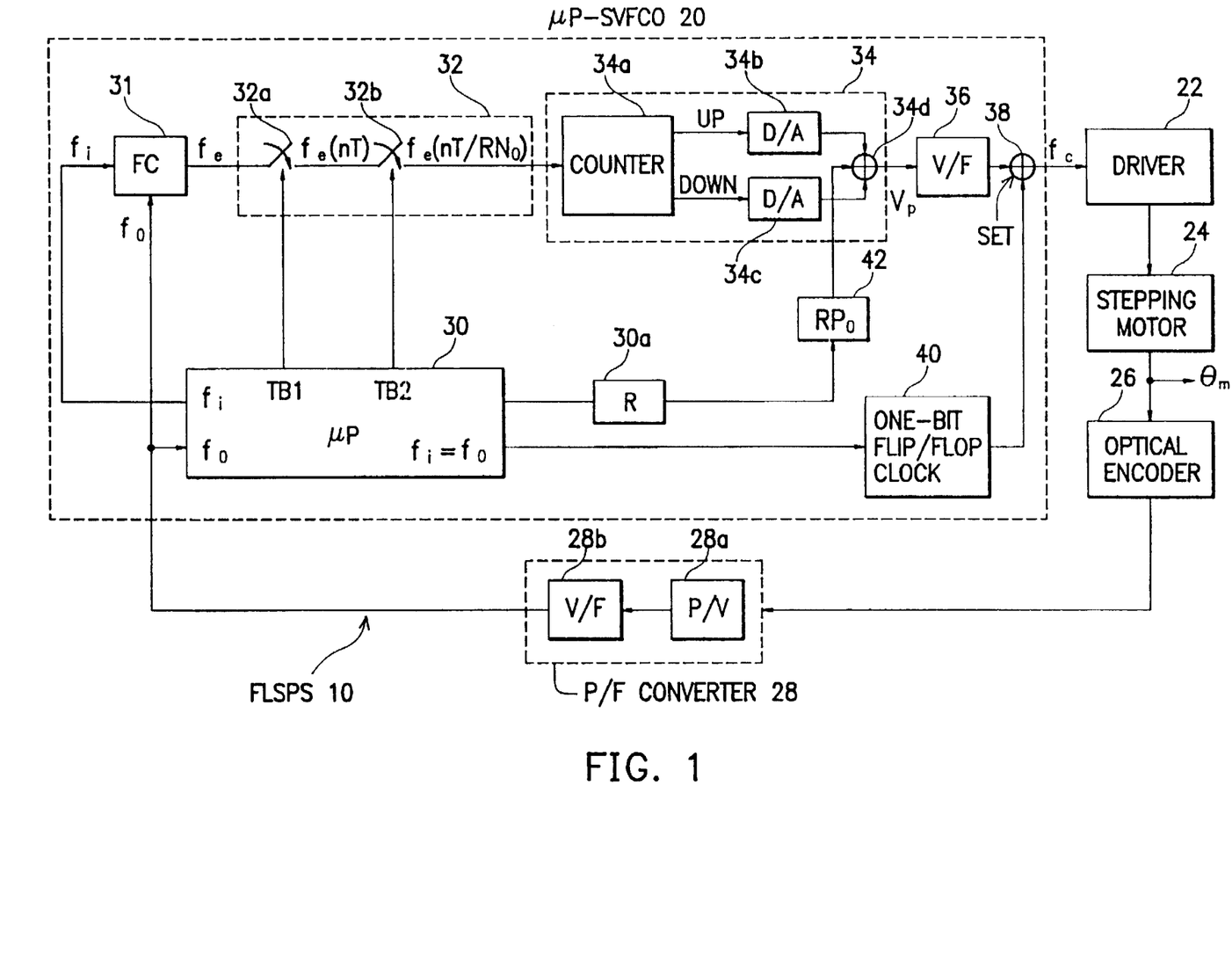
FIG. 1 is a block diagram of a frequency-locked stepping position control system, which includes a microprocessor-based slope-varied frequency-controlled oscillator (μP-SVFCO), a stepping motor and a position/frequency converter, in the present invention.

FIG. 1 is the block diagram of the FLSPS 10, which primarily includes a µP-SVFCO 20, a stepping motor 24 and a position/frequency converter 28 (hereafter called P/F converter), in the present invention. The µP-SVFCO 20, indicated as a dotted block, is composed of frequency comparator 31 (hereafter called FC), sampling means 32 (including samplers 32a and 32b), slope-varied converter 34 (primarily including counter 34a, digital-to-analog converters 34b and 34c), voltage-to-frequency converter 36 (hereafter called V/F), one-bit clock source 40 and microprocessor 30. The entire servo system is briefly described as follows. The µP-SVFCO 20 generates a driving signal with first frequency $f_c$ and the driving signal is fed into motor driver 22 to control the stepping motor 24. A lead screw (not shown) coupled to a shaft of the stepping motor 24 can produce linear displacement in proportion to the motor output angular displacement $\theta_m$, determined by first frequency $f_c$, to move an object toward a desired target. Generally, the driving signal is a pulse train signal with a pulse train frequency $f_c$, the first frequency. The optical encoder 26, usually mounted on the shaft of the stepping motor 24, then generates a position signal representing the position of the controlled object to P/F converter 28. The P/V 28, a feedback element of the FLSPS 10, generates a feedback signal with second frequency $f_0$ corresponding to the position of the object and primarily includes a P/V (position-to-voltage) converter 28a and a V/F converter 28b. Preferably, V/F converter 28b is a voltage-controlled oscillator. It is apparent that the µP-SVFCO 20 that generates the driving signal with first frequency $f_c$ according to the feedback signal with second frequency $f_0$ is a key building block of the FLSPS 10 and should be explained in detail.

In the µP-SVFCO 20, the microprocessor 30a is mainly a processor for identifying the pump slope constant R, providing a first time-base signal TB1 with a period of T and a second time-base signal TB2 with a period of $T/RN_0$ (typically $N_0$ is a positive integer), and generating an input signal with third frequency $f_i$ corresponding to an external input command for desired target. When the external input command is applied to microprocessor 30, the input signal with third frequency $f_i$ corresponding to the external input command is generated by microprocessor 30 and applied to FC 31, while the feedback signal with second frequency $f_0$ is converted by P/F converter 28 and also applied to FC 31. The FC 31 compares the third frequency $f_i$ with the second frequency $f_0$ and generates an error signal with a fourth frequency $f_e = f_i - f_0$, which represents the position error. The first sampler 32a samples the error signal by the first time-base signal TB1 and generates an initial sampled error signal, the frequency of which denotes $f_e(nT)$ Then the sampler 32b further samples the initially sampled error signal by the second time-base signal TB2 and then produces a secondary sampled error signal, the frequency of which denotes $f_e(nT/RN0)$. $N_0$ is a reference multi-sampling number and defined as the maximum integer of $|f_D/\Delta f_e|$, where $\Delta f_e$ is the allowable minimum frequency error and $f_D$ is the allowable maximum frequency error. A pump voltage $V_p$ is generated from the slope-varied conversion characteristic of the slope varied converter 34 according to the coming fourth frequency $f_e$ of the error signal and the pump slope constant R from a tracking means 30. The microprocessor 30 will generate a control signal by the initially sampled error signal to tracking means 30a and then tracking means 30a generates the pump slope constant R according to a conversion profile, described later. Then the driving signal with first frequency $f_c$ from the V/F converter 36, such as a voltage controlled oscillator, is generated to drive the stepping motor toward the target position. Once the system is locked, namely "$f_i = f_0$" is true, the V/F converter 36 is disabled (by the SEL signal in adder 38) and then one-bit clock source 40 is used to hold the motor at the desired position, where the one-bit clock source 40 is designed to present a positive pulse (for clockwise rotation) or a negative pulse (for counterclockwise rotation) in flip-flop state.

The principles of the slope-varied converter 34 are described as follows. The slope-varied converter 34 comprises one up/down counter 34a, two digital-to-analog is converters (hereafter called D/A converter) 34b and 34c and one adder 34d. The counter 34a generates a speed-up signal and a speed-down signal according the sampled error signal from the sampling means, to indicate whether the first frequency $f_c$ of the driving signal should rise or fall. A device 42, which may be included in slope-varied converter 34 or microprocessor 30, provides a reference voltage $RP_0$ corresponding to the pump slope constant, to serve as a basic component of the pump voltage $V_p$. The parameter $P_0$ denotes the reference pump voltage level. The first D/A converter 34b converts the speed-up signal into analog form in order to raise the reference voltage $RP_0$. The second D/A converter 34c converts the speed-down signal into analog form to reduce the reference voltage $RP_0$. The adder 34d merges the three components into a whole to generate the pump voltage $V_p$.

Figure 2:
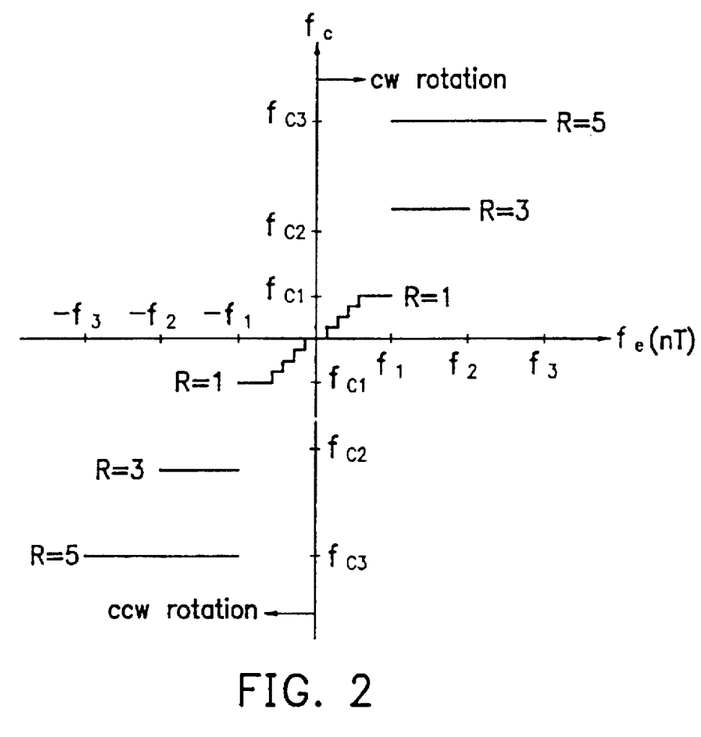
FIG. 2 shows the conversion characteristic of the microprocessor-based slope-varied frequency-controlled oscillator in the embodiment.
Figure 3:
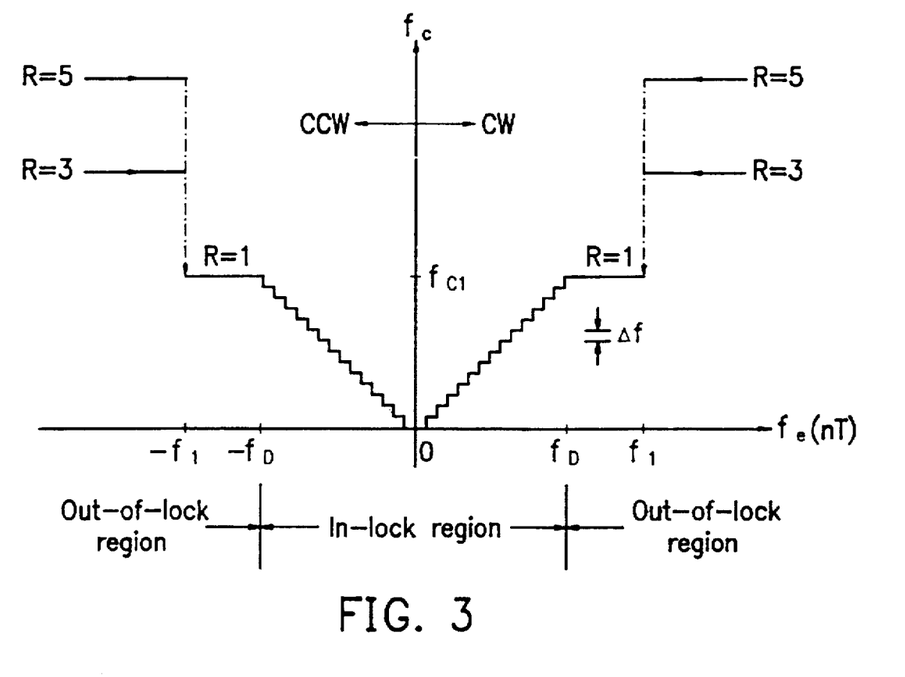
FIG. 3 shows the locking characteristic of the microprocessor-based slope-varied frequency-controlled oscillator in the embodiment.

FIG. 2 and FIG. 3 respectively illustrate the conversion characteristic and the locking characteristic of the μP-SVFCO 20, where $f_c$ denotes the first frequency, the pulse train frequency, for driving the stepping motor 24 and $f_e(nT)$, as described above, is the initially sampled frequency error $f_i-f_o$. Three constant frequencies $f_{c1}$, $f_{c2}$ and $f_{c3}$, defined by $RN_oP_oK_{v1}$, for R=1,3 and 5, are selected for explaining the working principle of the μP-SVFCO 20 and the μP-FLSPS 10. The parameter $P_o$ is the reference pump voltage level and $K_{v1}$, is the sensitivity of V/F converter 36. By means of the slope-varied technique, the μP-SVFCO 20 can provide a variable pulse train frequency to drive the stepping motor 24 toward the target position as fast as possible. Theoretically, the pump slope constant R may be infinite, but in practice a countable R value is enough to achieve the servo task. In FIG. 2, a family of conversion profiles of pulse frequency $f_c$ to frequency error $f_e$ is shown. Only one of the three conversion profiles is valid for a specified R value determined by the initially sampled frequency error $f_e(nT)$. Theoretically, values of the sampled frequency error $f_e(nT)$ may be partitioned into several regions. In our example, three regions of frequency error values are specified, i.e., R=1 profile is for $[-f_1,+f_1]$; R=3 profile is for $[-f_2,-f_1)\cup(+f_1,+f_2]$; R=5 profile is for $[-f_3,-f_2)\cup(+f_2,+f_3]$.

FIG. 3 demonstrates the locking characteristic when the system goes into an in-lock region near the target. The parameter $f_D$ is the maximum specified frequency error, which corresponds to the frequency-lock range or the position-lock range $\theta_D$. The conversion relation of $f_D$ and $\theta_D$ is a constant value and both two parameters also represent the fine-tuning ranges for system locking to the desired position. As the frequency error $f_e(nT)$ is within the in-lock region, namely, between $-f_D$ and $f_D$, the driving signal frequency is gradually reduced such that the system approximates the locked state.

In FIG. 2 and FIG. 3, CW (clockwise) and CCW (counter clockwise) refer to the moving direction of the stepping motor 24. If $f_e>0$, i.e., $f_i>f_o$, the motor moves in CW direction. If $f_e<0$, i.e., $f_i>f_o$, the motor moves in CCW direction.

Figure 4:
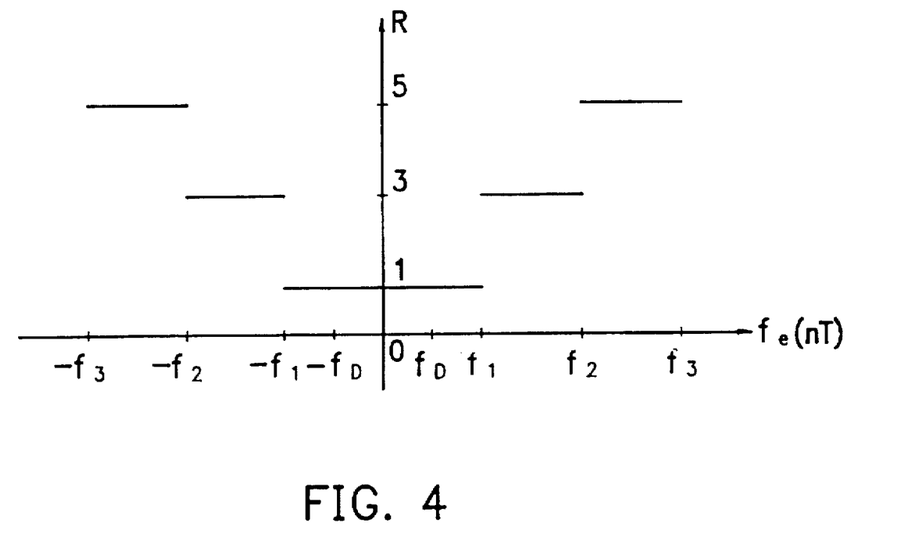
FIG. 4 is a graph of indicating the conversion relationship between the pump slope R and the error frequency $f_e$ in this embodiment of the present invention.

The pump slope constant R may be determined in the device 30a from the pump slope selection guide of FIG. 4, according to a control signal generated by the microprocessor 30 with regard to the initial sampled frequency error $f_e(nT)$ from the sampler 32a.

Figure 5:
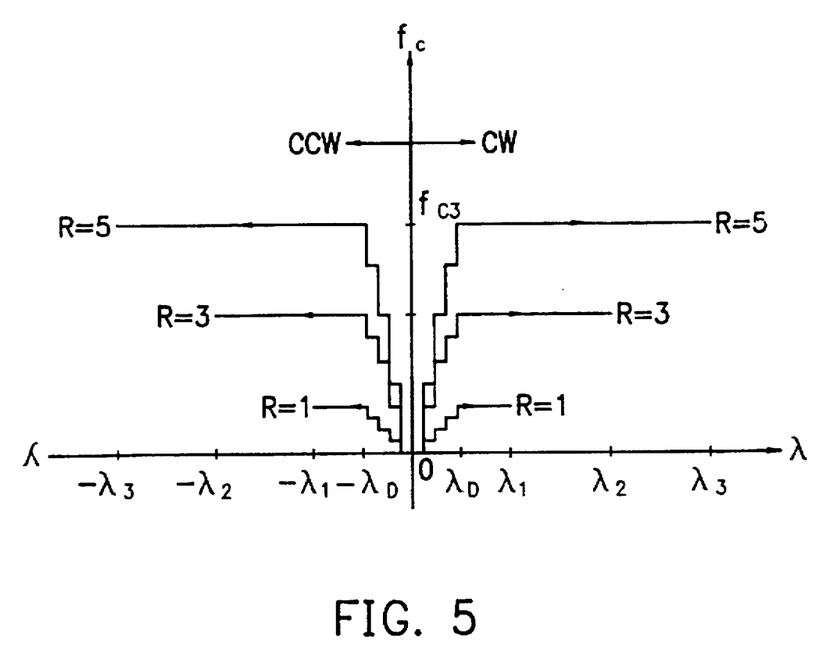
FIG. 5 is a graph of showing the acceleration process pumping toward the target in this embodiment of the present invention.
Figure 6:
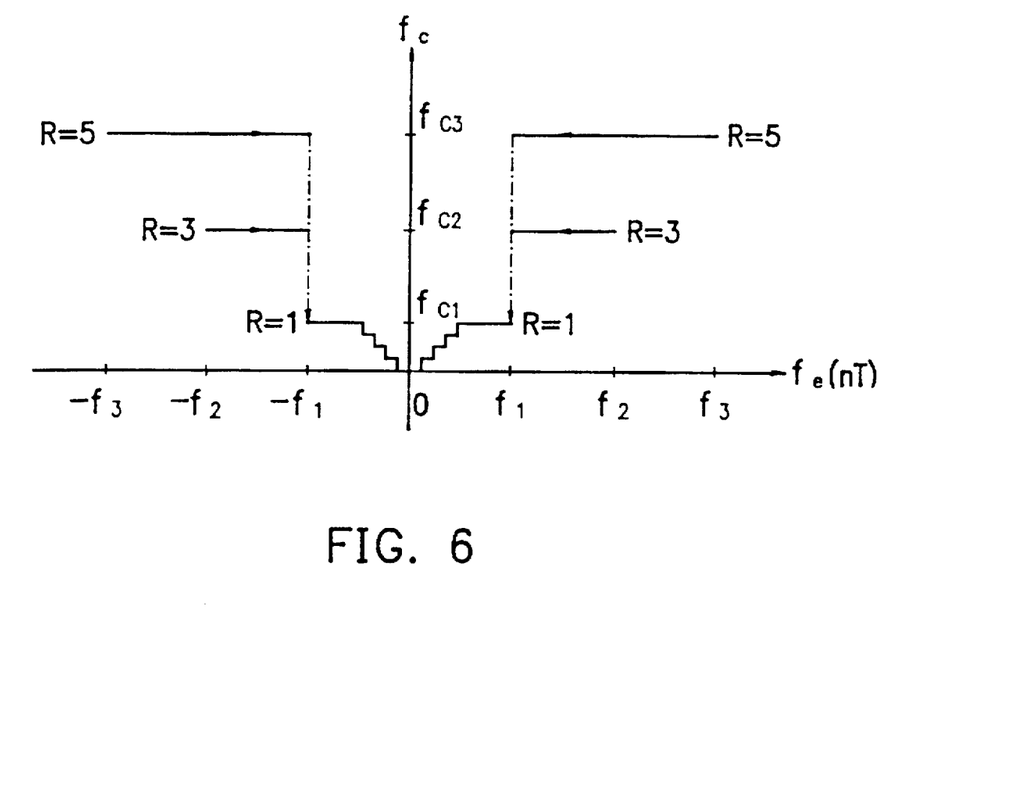
FIG. 6 is a graph of showing the deceleration process pumping toward the target in this embodiment of the present invention.
Figure 7:
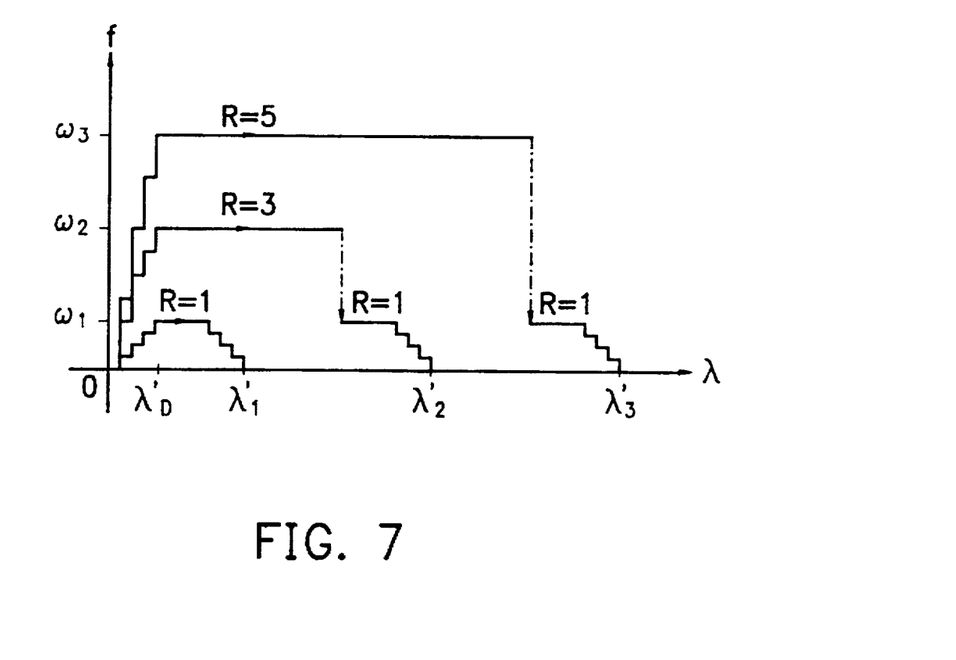
FIG. 7 is a graph of predicted complete locking processes of a frequency-locked stepping position system in this embodiment of the present invention.

FIG. 5, FIG. 6 and FIG. 7 respectively show the acceleration process, the deceleration process and the complete locking process pumping toward target in this embodiment of the present invention. For example, if the initial sampled frequency error $f_e(nT)$, falls within $[-f_3,-f_2)\cup(+f_2,+f_3]$, the pump slope constant R is then selected as 5. FIG. 5 illustrates tracking profiles of the pulse train frequency $f_c$ with respect to the position λ in the cases of R=1, 3, and 5. As shown in FIG. 5, the pulse train frequency $f_c$ is then pumped upward by R=5 curve to $f_{c3}$, which is a constant clock frequency for driving the stepping motor 24 at a constant speed in the clockwise (or counterclockwise) direction toward the target. For clarification, the pulse train frequency $f_c$ with respect to the reduced frequency error $f_e(nT)$ is shown in FIG. 6. It is easily seen that when the motor moves near the target, the frequency error $f_e(nT)$ in FIG. 6 is reduced in a way of approaching toward the origin. Assume that the target position is set at a position $λ'_3$ (corresponding to a pulse train frequency $f'_3$) within $λ_2$ and $λ_3$. The sampled frequency error $f_e(nT)$ is reduced from $f'_3$ to $f_1$, which means that near the target position $λ'_3$, microprocessor 30 immediately changes the pump slope constant R to 1, namely, the locking profile of FIG. 6, similar to FIG. 3, is effective for the remaining control route. When the control system goes into the in-lock region where the sampled frequency error $f_e(nT)$ is further reduced within $\pm f_D$, a fine tuning process for approaching the desired position begins. When the detected frequency error $f_e$ is zero, i.e., $f_i=f_o$, V/F converter 36 is disabled by a signal SEL and the one-bit clock source 40 provides alternatively positive or negative pulse trains to flip and flop holding the stepping motor at the desired position $λ'_3$. As soon as the detected frequency error $|f_e(nT)|$ is greater than the tuning frequency step Δf, one-bit clock source 40 is disabled by the signal SEL and the locking process of FIG. 6 begins again.

FIG. 7 illustrates a complete system locking process for our example, including acceleration, constant speed motion and deceleration. The initial process for approaching the target position $λ'_3$ is conducted with R=5 profile, the process of changing to the R=1 profile is effective when $f_e \leq f_1$. Another two locking processes for typical position commands of the targets at $λ'_2$ within $λ_1$ and $λ_2$, and $λ'_1$ within $λ_1$ and 0, are also depicted in FIG. 7. Remarkably, the motion profiles for all pumping cases are adaptively generated according to the sampled frequency error. No motion profiles need to be installed beforehand in the controller. The μP-FLSPS in the present invention is actually an adaptive control system.

Figure 8:
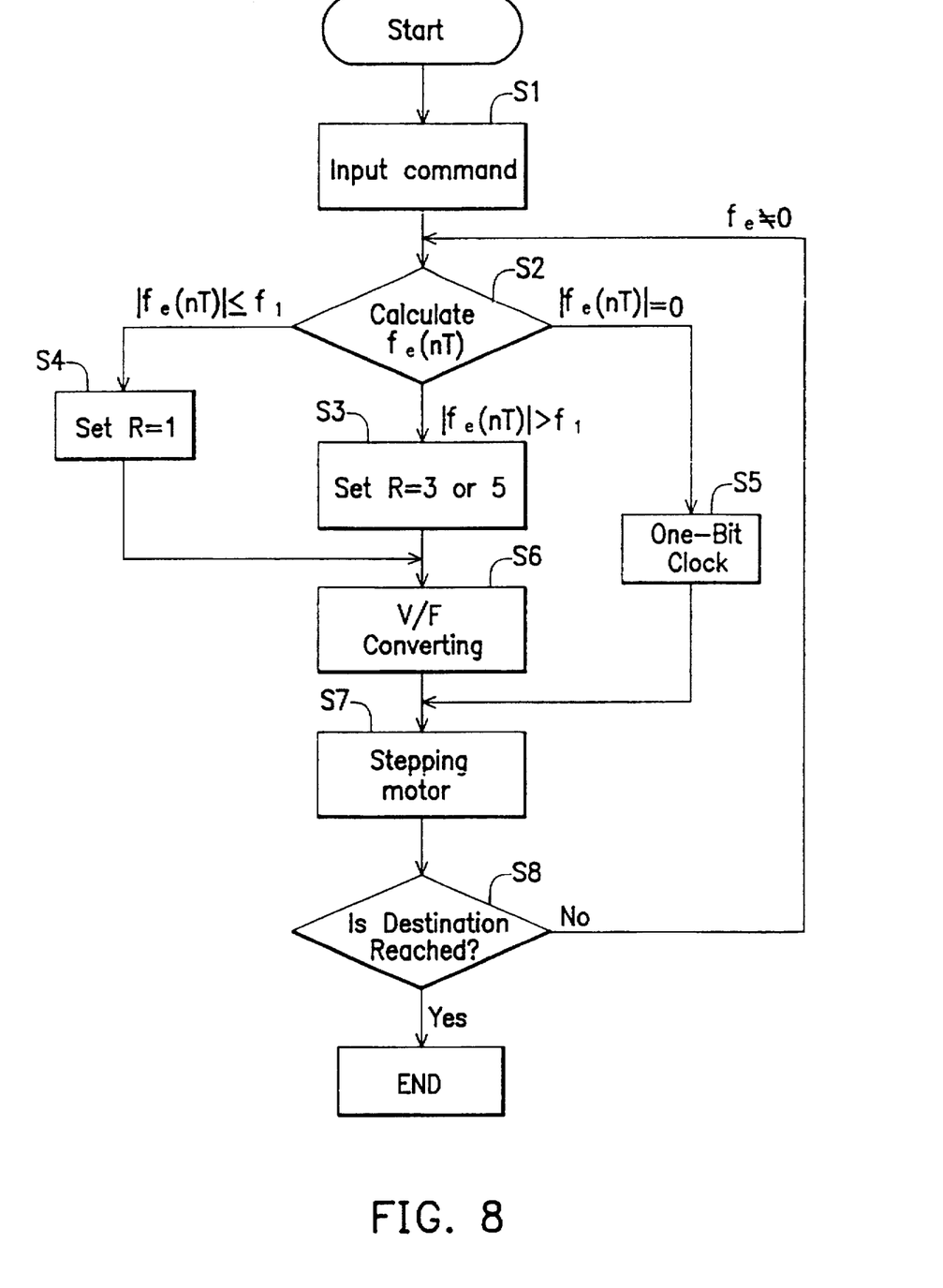
FIG. 8 is a system control flow chart of the frequency-locked stepping position servo system according to FIG. 1.

FIG. 8 shows the control flowchart of a FLSPS system in this embodiment. In Step S1, an external input command, indicating the target position, is input to microprocessor 30 to commence the proceeding control process. Next, in Step S2, the initially sampled frequency error $f_e(nT)$ is calculated and a decision is made whether $f_e(nT)$ is greater than $f_1$, the first criterion frequency. If yes, the pump slope constant R is set as 3 or 5 in Step S3, according to the initially sampled frequency error $f_e(nT)$ and the conversion characteristic demonstrated in FIG. 2. If no, the pump slope constant R is set as 1 in Step S4. After voltage-to-frequency converting in Step S6 and actually driving the stepping motor in Step S7, a decision is made in Step S8 as to whether the destination has been reached or not. If no, it means $f_e\neq 0$ and the system should be back to Step S2. In addition, as illustrated in FIG. 1, a one-bit clock is used to replace the driving signal to dynamically maintain the position of the target after the destination is reached.

Figure 9:
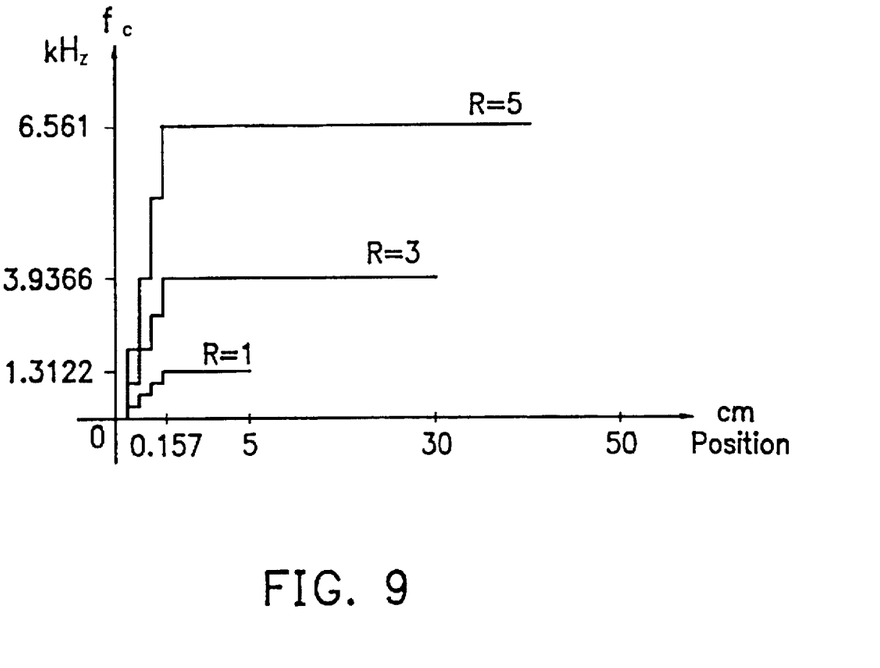
FIG. 9 shows the real conversion characteristic in the example of the embodiment.
Figure 10:
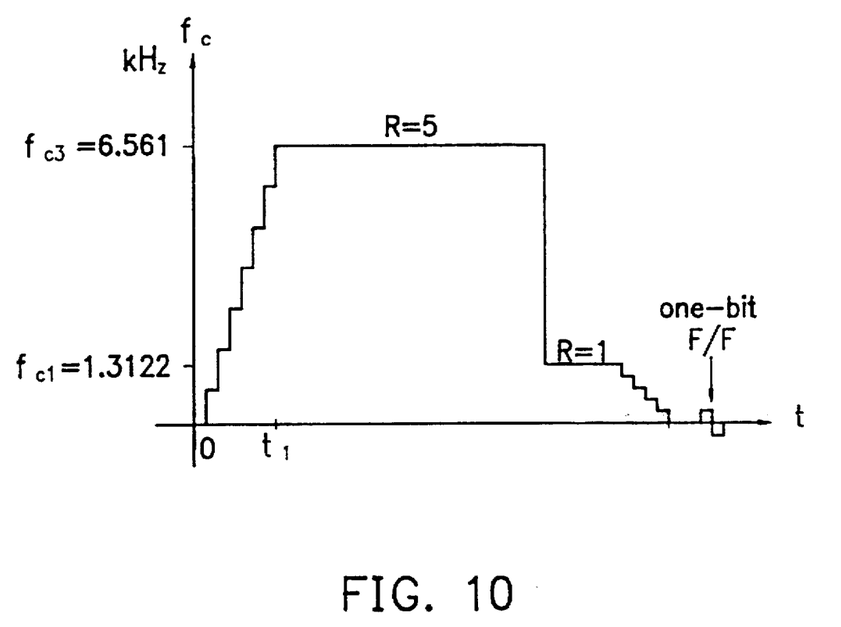
FIG. 10 shows the motion profile for the target reach in the example of the embodiment.

A typical one-dimensional, position servo control system ranging from 0 to 50 cm is taken for explanation. The starting point is at 0 cm and P/F converter 28 has conversion parameters from 0.517 kHz (0 cm) to 43.668 kHz (50 cm). Three values of the pump slope constant R, namely, 1, 3 and 5, are selected. FIG. 9 shows the real conversion characteristic in this example, where the three reference frequencies for the first frequency $f_c$ are $f_{c1}$=1.3122 kHz, $f_{c2}$=3.9366 kHz, $f_{c3}$=6.561 kHz, and the reference positions are $\lambda_3$=50 cm, $\lambda_2$=30 cm, $\lambda_1$=10 cm and $\lambda_D$=0.157 cm. The effective R value is determined by initial sampled position errors (corresponding to frequency errors $f_e$(nT)) while the position errors are ranged as 0–5 cm for R=1, 5–30 cm for R=3, and 30–50 cm for R=5, respectively. Now supposing the external input command is 0→45 cm, then, the initially detected position error is 45 cm, namely, it falls within 30 cm<45 cm<50 cm and the R=5 profile is selected. The pulse train frequency $f_c$ for the stepping motor is pumping to 6.561 kHz during the range shown in FIG. 9. If slope-varied converter 34 has 12 bits, there are $N_0=2^{12}$=4096 steps for multi-rating sampling. Note that T=0.12 seconds is the sampling period and $T/N_0$=29.3 seconds is the multi-rate sampling period. As the motor drives toward the target, the position error is reduced. When the detected position error is smaller than 5 cm, namely, it falls within the 0–5 cm range, the R=1 profile is then selected and the motor drives at a frequency of 1.3122 kHz toward the target. When is the position error is smaller than 0.157 cm, a fine-tuning task begins to reach the desired destination. Once the case of $f_i-f_0=0$ happens, the driving signal from the V/F converter 36 is bypassed and a one-bit clock starts to hold the desired position by alternatively positive and negative flip-flop pulses. The motion profile for the target reach in the example is shown in FIG. 10, where the function of the one-bit clock is clearly illustrated.

Figure 11:
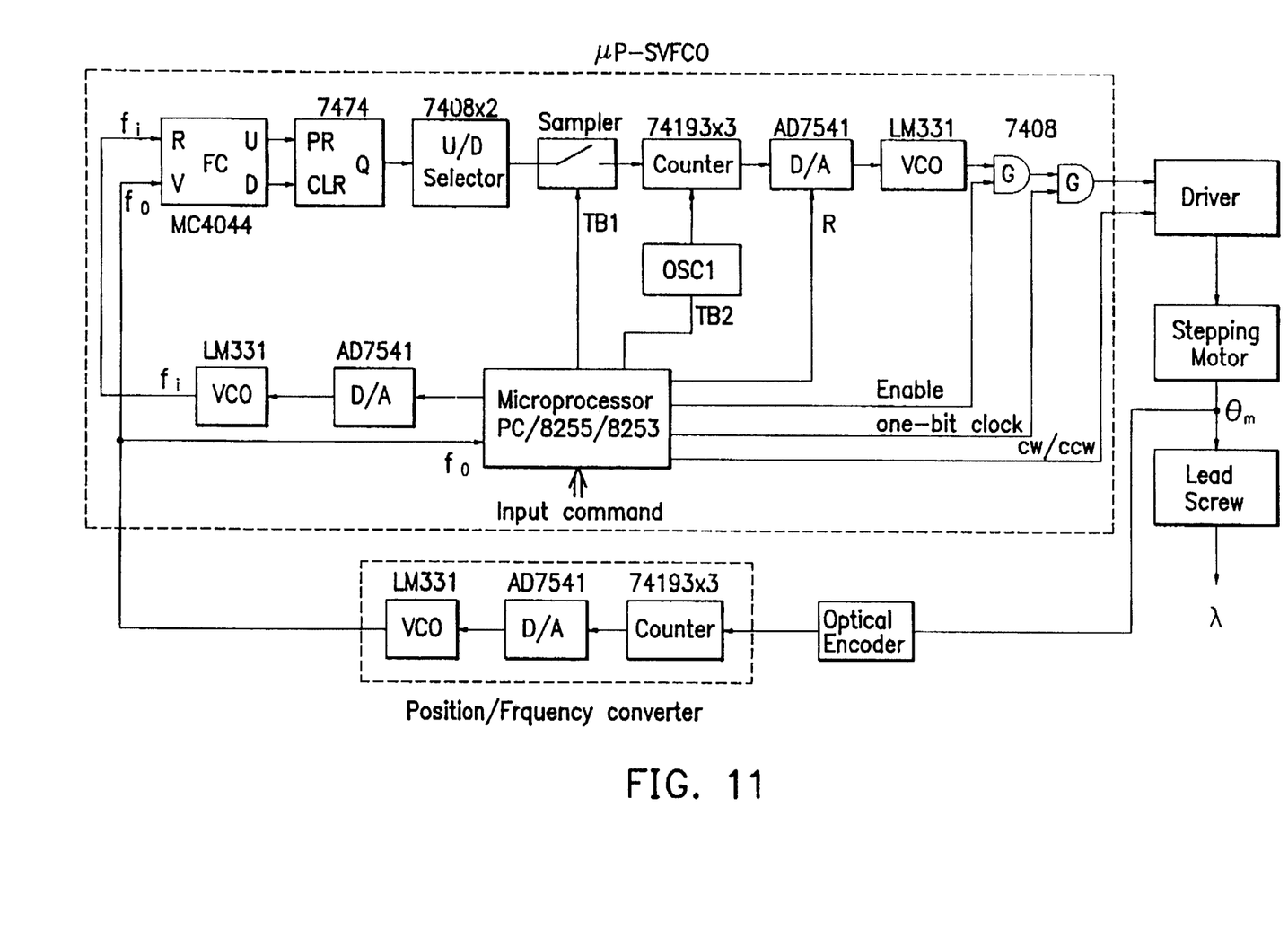
FIG. 11 is an embodied circuit diagram showing the prototype circuit of the frequency-lock stepping position servo system according to the present invention.

A prototype of a one-dimensional stepping position servo control system with a control range of 0–50 cm is realized. In this realization, the specifications of the steady-state position are an error of less than 0.1%, an overshoot of less than 1% and a position accuracy of within 10 μm. The realized circuit is illustrated in FIG. 11 and IC chips for the building blocks are marked. Key components in the realized circuit are briefly described as follows. FC 31 consists of MC4044 and some peripheral circuits, in which a 7474 flip-flop is used to indicate the cases of $f_i>f_o$, $f_i<f_o$ and $f_i=f_o$. The one-bit clock is generated from 8255 output port that provides a 1 Hz clock signal to drive the stepping motor in a CW or CCW direction when the case of $f_i=f_o$ occurs. 12-bit up/down counter 34a and 12-bit D/A 34b are implemented by three 74193 ICs and an AD7541 IC, respectively. The microprocessor 30 consists of PC/AT with 8255 POI and 8253 timer/counter. The digital code for generating the input frequency $f_i$ is issued from the microprocessor 30 and output through the 8255 IC. The frequencies $f_i$ and $f_o$ are sampled by 8253 at t=nT, and the error frequency $f_e$(nT) is measured. The stepping motor 24 used in this example is STEP-SYN type 103-746-1010 with 200 steps per revolution (1.8°/step). A 200-line incremental rotary optical encoder is mounted on the shaft of the stepping motor 24. As the motor rotates, the encoder outputs the position signal. A lead screw with 2 mm/turn accuracy is also mounted on the shaft of the stepping motor. Since the encoder produces 200 pulses per revolution, the position accuracy of each step is (2 mm/turn) *(turn/200 steps)=10 μm/step. The P/F converter 28 consists of a 12-bit up/down counter (74193x3), a 12-bit D/A converter (AD7541) and a voltage-controlled oscillator 2 (LM331 and LF351). The input signal with frequency $f_i$ is generated by a 12-bit D/A converter (AD7541) and a voltage-controlled oscillator (LM331). The output range of voltage-controlled oscillator issuing the input signal with the third frequency $f_i$ should be the same as that of voltage-controlled oscillator issuing the feedback signal with the second frequency $f_0$, in order to minimize uncertainty between the output position and the external input command.

Figure 12:
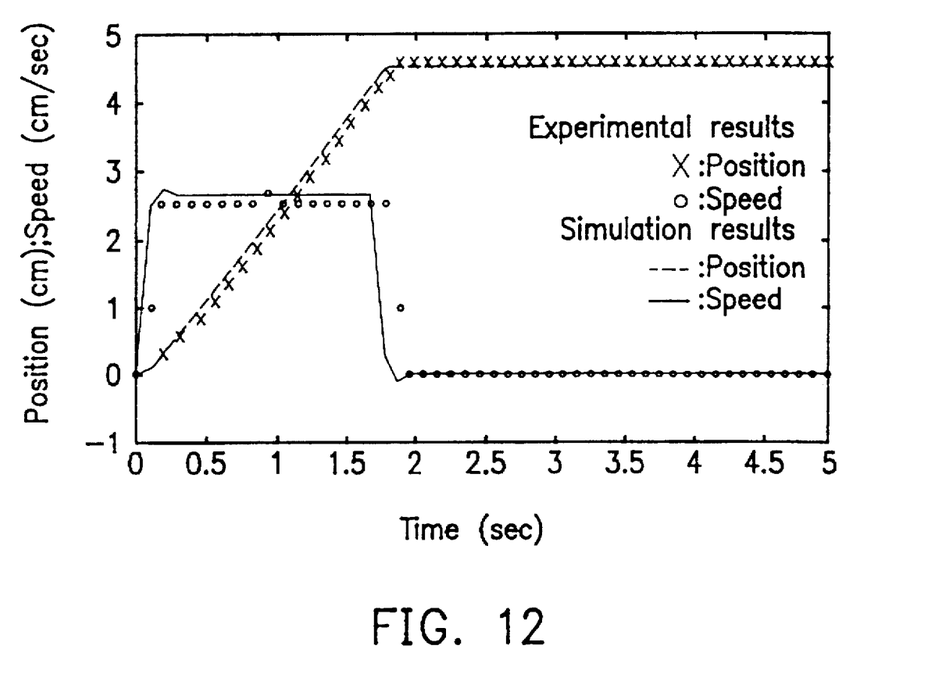
FIG. 12 respectively illustrates the simulation and experimental results of a prototype system in the case of moving from 0 cm to 4.5 cm.
Figure 13:
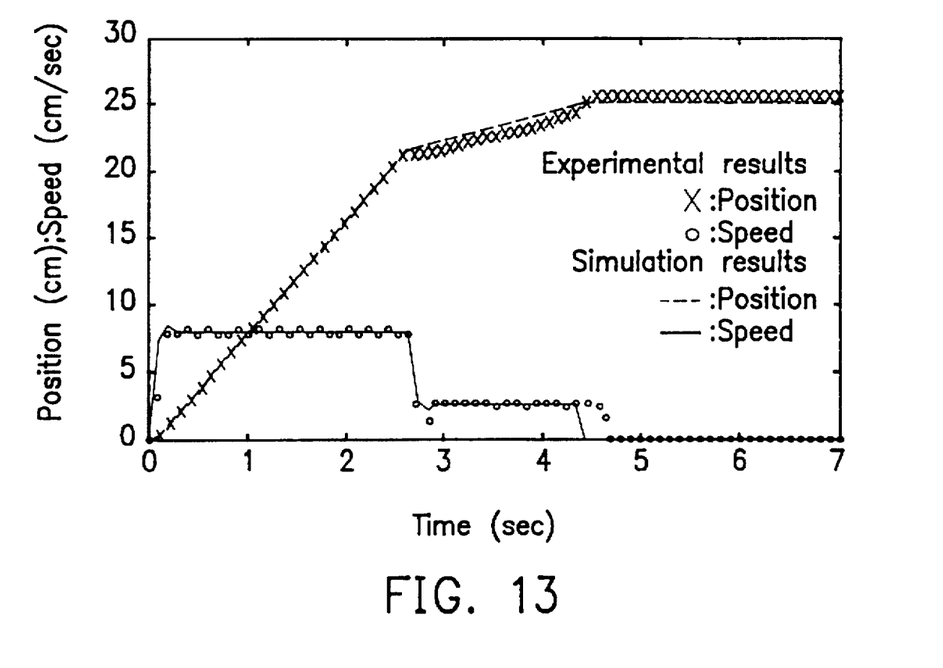
FIG. 13 respectively illustrates the simulation and experimental results of the prototype system in the case of moving from 0 cm to 25 cm.
Figure 14:
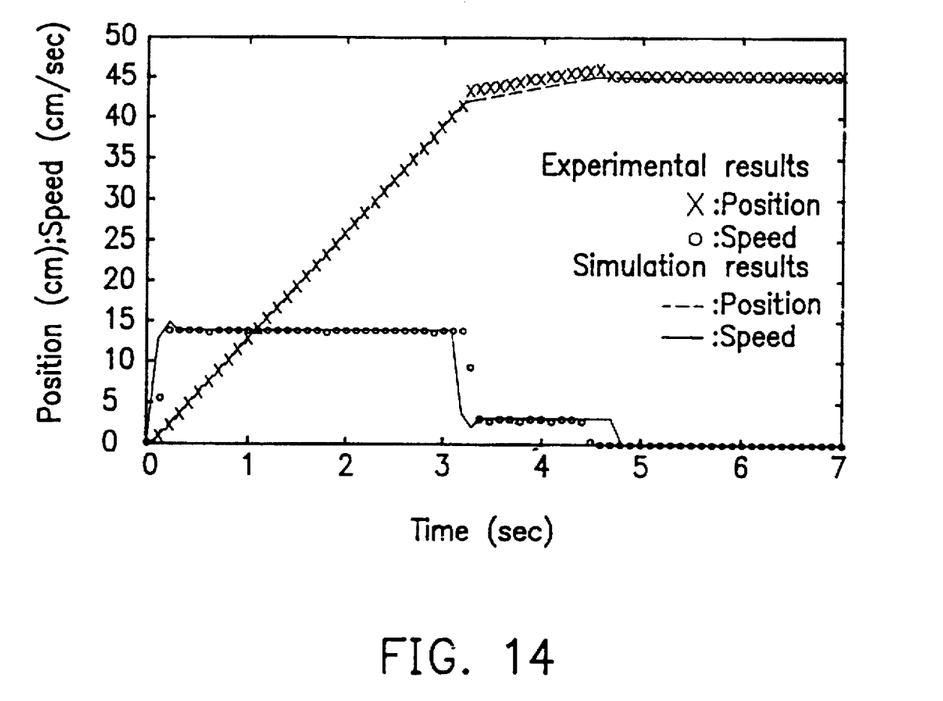
FIG. 14 respectively illustrates the simulation and experimental results of the prototype system in the case of moving from 0 cm to 45 cm.

Computer simulation of the control system using MATLAB and SIMNON software programs is executed for comparison. Position and speed responses with regard to three kinds of target position are simulated. The three external input commands are 0→4.5 cm ($\lambda_1$), 0→25 cm ($\lambda_2$), 0→45 cm ($\lambda3$). The simulation results are shown in FIG. 12, FIG. 13 and FIG. 14, respectively, in which the experiment results of the above prototype system are also depicted for comparison. In all the cases, the experimental data are very close to simulation results.

In FIG. 12, the movement 0→4.5 cm is conducted. Only the R=1 profile is selected for pumping the speed from zero to 2.63 cm/sec, while the acquisition time for the stepping motor 24 to reach the target position is 1.8 seconds. In FIG. 13, the movement 0→25 cm is conducted. The R=3 profile is first employed for pumping and the maximum speed is maintained at 7.88 cm/sec until the position of 22 cm is reached. Then the parameter R is changed to 1. The total acquisition time is 4.6 seconds. In FIG. 14, the movement 0→45 is conducted. The R=5 profile is first selected in the movement range of 0→42 cm with a maximum speed of 13.15 cm/sec. After reaching 42 cm, the R=1 profile is then selected for moving toward 45 cm position. The target position 45 cm is reached at 4.8 seconds. The acquisition times for the three position commands are 1.8 seconds, 4.6 seconds and 4.8 seconds, respectively. These results demonstrate the effectiveness of the slope-varied technique of the embodiment in reducing the acquisition time of a middle or long distance position command. Both simulation and experimental results indicate that the speed overshoot for step input is less than 1%, the position overshoot is close to zero and the steady-state position error is within ±10 cm.

The foregoing description of preferred embodiments of the present invention has been provided for the purposes of illustration and description. It is not intended to be exhaustive or to limit the invention to the precise forms disclosed. Many modifications and variations will be apparent to practitioners skilled in this art. The embodiments were chosen and described to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A frequency-locked stepping position control system for driving a stepping motor, comprising:
    a means for driving the stepping motor by a driving signal with a first frequency, to move an object toward a target indicated by an external input command;
    a means for detecting the position of the object to generate a position signal representing the position of the object;
    a means for position-to-frequency converting the position signal into a feedback signal with a second frequency that corresponds to the position of the object;
    a means for comparing the second frequency of the feedback signal with a third frequency of an input signal to generate an error signal with a fourth frequency that is the same as the difference of the second frequency and the third frequency;
    a microprocessor for generating the input signal corresponding to the external input command, generating a first time-base signal and a second time-base signal, and generating a control signal;
    a means for tracking the control signal from the microprocessor to generate a pump slope constant;

a means for consecutively sampling the error signal by the first time-base signal and the second time-base signal, wherein the error signal sampled by the first time-base signal is applied to the microprocessor to generate the control signal;

a slope-varied converter for varying a pump voltage according to the sampled error signal from the sampling means and the pump slope constant; and a means for voltage-to-frequency converting the pump voltage into the driving signal, wherein the first frequency of the driving signal is proportional to the pump voltage.

2. The frequency-locked stepping position control system as set forth in claim 1, wherein the slope-varied converter comprises:

a counter for generating a speed-up signal and a speed-down signal, indicating whether the first frequency of the driving signal is increasing or decreasing, according to the sampled error signal from the sampling means;

a means for providing a reference voltage of the pump voltage corresponding to the pump slope constant;

a first means for converting the speed-up signal into analog form to raise the reference voltage to the pump voltage; and a second means for converting the speed-down signal into analog form to reduce the reference voltage to the pump voltage.

3. The frequency-locked stepping position control system as set forth in claim 1, wherein the position-to-frequency converting means comprises:

a means for generating a transfer voltage according to the position signal from the detecting means; and a means for generating the feedback signal according to the transfer voltage, in which the second frequency is proportional to the transfer voltage.

4. The frequency-locked stepping position control system as set forth in claim 1, wherein the detecting means is an optical encoder which is mounted on the shaft of the stepping motor.

5. The frequency-locked stepping position control system as set forth in claim 1, wherein the voltage-to-frequency converting means is a voltage-controlled oscillator.

6. The frequency-locked stepping position control system as set forth in claim 1, further comprising:

a one-bit clock source for replacing the driving signal with a one-bit clock to drive the stepping motor when the frequency-locked stepping position control system has been locked.

7. The frequency-locked stepping position control system as set forth in claim 6, wherein the slope-varied converter comprises:

a counter for generating a speed-up signal and a speed-down signal, indicating whether the first frequency of the driving signal is increasing or decreasing, according to the sampled error signal from the sampling means;

a means for providing a reference voltage of the pump voltage corresponding to the pump slope constant;

a first means for converting the speed-up signal into analog form to raise the reference voltage to the pump voltage; and a second means for converting the speed-down signal into analog form to reduce the reference voltage to the pump voltage.

8. The frequency-locked stepping position control system as set forth in claim 7, wherein the position-to-frequency converting means comprises:

a means for generating a transfer voltage according to the position signal from the detecting means; and a means for generating the feedback signal according to the transfer voltage, in which the second frequency is proportional to the transfer voltage.

9. The frequency-locked stepping position control system as set forth in claim 8, wherein the voltage-to-frequency converting means is a voltage-controlled oscillator.

10. The frequency-locked stepping position control system as set forth in claim 9, wherein the detecting means is an optical encoder which is mounted on the shaft of the stepping motor.

* * * * *